US012673884B2

(12) United States Patent
Padmanaban et al.

(10) Patent No.: US 12,673,884 B2
(45) Date of Patent: Jul. 7, 2026

(54) ACID RAIN DIFFUSION BASED ON VULNERABLE ZONE CLASSIFICATIONS

(71) Applicant: International Business Machines Corporation, Armonk, NY (US)

(72) Inventors: Manikandan Padmanaban, Chennai (IN); Sarbajit K. Rakshit, Kolkata (IN); Jagabondhu Hazra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 18/351,128

(22) Filed: Jul. 12, 2023

(65) Prior Publication Data

US 2025/0019278 A1    Jan. 16, 2025

(51) Int. Cl.
*C02F 1/52*     (2023.01)
*C02F 101/10*    (2006.01)
*C02F 101/16*    (2006.01)

(52) U.S. Cl.
CPC .......... *C02F 1/5209* (2013.01); *C02F 1/5236* (2013.01); *C02F 2101/101* (2013.01); *C02F 2101/16* (2013.01); *C02F 2209/07* (2013.01)

(58) Field of Classification Search
CPC ........ C02F 1/5209; G06V 20/00; G06Q 50/02
See application file for complete search history.

(56) References Cited

U.S. PATENT DOCUMENTS

| | | | |
|---|---|---|---|
| 2004/0253160 A1 | 12/2004 | Jones | |
| 2010/0005967 A1* | 1/2010 | Hartman | B01D 53/62 |
| | | | 95/232 |
| 2018/0292826 A1* | 10/2018 | DeFelice | A01G 15/00 |
| 2019/0232246 A1* | 8/2019 | Zou | A01G 15/00 |
| 2021/0138401 A1* | 5/2021 | Hatton | C01B 35/128 |
| 2022/0091026 A1* | 3/2022 | Scott | G01P 13/045 |
| 2023/0169222 A1* | 6/2023 | Wang | G06F 30/20 |
| | | | 703/1 |

FOREIGN PATENT DOCUMENTS

| | | | |
|---|---|---|---|
| CN | 101574051 A | * 11/2009 | |
| CN | 113114990 A | 7/2021 | |

(Continued)

OTHER PUBLICATIONS

English Translation of CN 101574051 A (Year: 2009).*

(Continued)

*Primary Examiner* — Shelby A Turner
*Assistant Examiner* — Ibrahim Nagi Shohatee
(74) *Attorney, Agent, or Firm* — Yee & Associates, P.C.

(57) ABSTRACT

A computer implemented method for selective diffusion of acid rain. A number of processor units identifies concentrations of acidic gases using a set of satellite images. The number of processor units locates hot spots on a land using the concentrations of acidic gases. The number of processor units classifies the hot spots on the land into vulnerable zones having vulnerable zone classifications. The number of processor units determines cloud seeding materials and alkaline compounds known for the vulnerable zones to selectively diffuse the acidic gases and cause precipitation in the vulnerable zones based on the vulnerable zone classifications for the vulnerable zones.

18 Claims, 10 Drawing Sheets

(56) References Cited

FOREIGN PATENT DOCUMENTS

| | | |
|---|---|---|
| CN | 218411879 U | 1/2023 |
| CN | 218445401 U | 2/2023 |
| CN | 218584649 U | 3/2023 |
| EP | 0207616 B1 | 8/1990 |

OTHER PUBLICATIONS

Anonymous, "Using Machine Learning capability to remove SO2 from air and reusing the same for manufacturing H2SO4," An IP.com Prior Art Database Technical Disclosure, IPCOM000255966D, Oct. 26, 2018, 6 pages. https://priorart.ip.com/IPCOM/000255966.

"Acid Rain—Causes of Acid Rain", Retrieved from: https://web.archive.org/web/20221010062413/https://byjus.com/chemistry/acid-rain/, Oct. 10, 2022, 15 pages.

"Effects of Acid Rain", Retrieved from: https://web.archive.org/web/20240927064449/https://www.epa.gov/acidrain/effects-acid-rain, Sep. 27, 2024, 6 pages.

"India Largest So2 Emitter in the World, Show Satellite Images", Retrieved from: https://www.carboncopy.info/india-largest-so2-emitter-in-the-world-show-satellite-images, Aug. 14, 2019, 7 pages.

"Nitrogen Dioxyde (No2) in Our Atmosphere", Retrieved from: https://aqicn.org/faq/2017-01-10/nitrogen-dioxyde-no2-in-our-atmosphere/, Jan. 10, 2017, 5 pages.

"Positive Aspect of Acid Rain", Retrieved from: https://web.archive.org/web/20250810200814/https://www3.open.ac.uk/events/1/200483_59971_01.pdf, Aug. 10, 2022, 1 page.

"Spectroscopy and Atmospheric Chemistry", Retrieved from: https://web.archive.org/web/20220512095112/https://le.ac.uk/chemistry/research/spectroscopy-and-atmospheric-chemistry, May 12, 2022, 2 pages.

"What is Acid Rain?", Retrieved from: https://web.archive.org/web/20160929000204/https://www.epa.gov/acidrain/what-acid-rain, Sep. 29, 2015, 3 pages.

"What is Cloud Seeding?", Retrieved from: https://web.archive.org/web/20200924201547/https://www.dri.edu/cloud-seeding-program/what-is-cloud-seeding/, Sep. 24, 2020, 4 pages.

Blue, M., "The Advantages of Acid Rain", Retrieved from: https://web.archive.org/web/20220618183812/https://education.seattlepi.com/advantages-acid-rain-5985.html, Jun. 18, 2022, 4 pages.

Rogers, C., "The Effects of Soil Pollution on Plants & Flora", Retrieved from: https://www.sciencing.com/facts-5661426-effects-soil-pollution-plants-flora/, Mar. 24, 2022, 6 pages.

* cited by examiner

COMPUTING ENVIRONMENT
100

FIG. 3

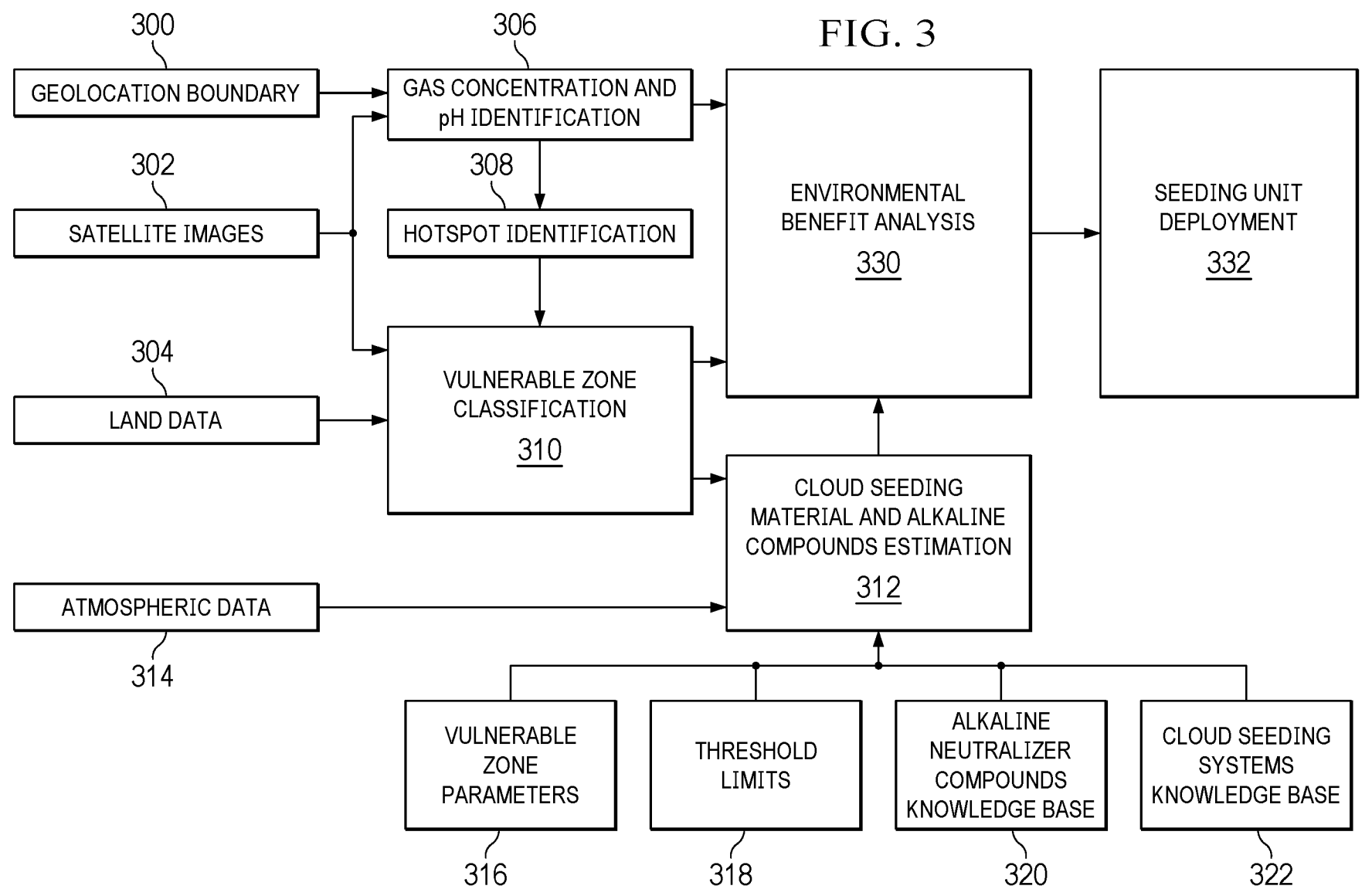

- GEOLOCATION BOUNDARY — 300
- SATELLITE IMAGES — 302
- LAND DATA — 304
- ATMOSPHERIC DATA — 314
- GAS CONCENTRATION AND pH IDENTIFICATION — 306
- HOTSPOT IDENTIFICATION — 308
- VULNERABLE ZONE CLASSIFICATION — 310
- CLOUD SEEDING MATERIAL AND ALKALINE COMPOUNDS ESTIMATION — 312
- ENVIRONMENTAL BENEFIT ANALYSIS — 330
- SEEDING UNIT DEPLOYMENT — 332
- VULNERABLE ZONE PARAMETERS — 316
- THRESHOLD LIMITS — 318
- ALKALINE NEUTRALIZER COMPOUNDS KNOWLEDGE BASE — 320
- CLOUD SEEDING SYSTEMS KNOWLEDGE BASE — 322

500

$$J = \text{Max.} \sum_{j=1}^{N} u_j \{ \underbrace{w_{seq} \cdot E_{seq,j}}_{502} + \underbrace{w_{met} \cdot E_{met,j}}_{504} + \underbrace{w_{acid} \cdot E_{acid,j}}_{506} \underbrace{- w_d \cdot C_j}_{508} \}$$

600

| | | | | | | |
|---|---|---|---|---|---|---|
| 0.8 | 2.4 | 2.5 | 3.9 | 0.0 | 4.0 | 0.0 |
| 2.4 | 0.0 | 4.0 | 1.0 | 2.7 | 0.0 | 0.0 |
| 1.1 | 2.4 | 0.8 | 4.3 | 1.9 | 4.4 | 0.0 |
| 0.6 | 0.0 | 0.3 | 0.0 | 3.1 | 0.0 | 0.0 |
| 0.7 | 1.7 | 0.6 | 2.6 | 2.2 | 6.2 | 0.0 |
| 1.3 | 1.2 | 0.0 | 0.0 | 0.0 | 3.2 | 5.1 |
| 0.1 | 2.0 | 0.0 | 1.4 | 0.0 | 1.9 | 6.3 |

ACID RAIN DIFFUSION BASED ON VULNERABLE ZONE CLASSIFICATIONS

BACKGROUND

The disclosure relates generally to an improved computer system and more specifically to selectively managing acid rain based the vulnerability of land regions to acid rain.

Acid rain is rain or any other form of precipitation that is acidic. Acid rain has elevated levels of hydrogen ions resulting in a lower pH as compared to a neutral pH of 7.0. Most water has a pH range from about 6.5 to about 8.5. Acid rain has a pH level that is lower and can have a pH from 4.0 to 5.0.

Acid rain can occur through emissions of nitrogen oxides (NOx) and sulfur dioxide (SO2). When these types of emissions react with water, oxygen and other chemicals, nitrogen oxides (NOx) can form nitric acid (HNO3) and the sulfur dioxide can form sulfuric acid (H2SO4).

Acid rain has undesired effects on the environment. For example, acid rain can have adverse effects on forests, fields, and farmland. In these areas, acid rain can reduce tree bark durability and leave other foliage more susceptible to environmental stressors such as drought, heat, cold, and pest infestation. Further, the effects of acid rain can be seen in aquatic environments such as streams, lakes, and marshes. Acid rain can be harmful to fish and other wildlife in these types of environments.

Additionally, acid rain flowing through soil can leach aluminum from salt clay particles and flow into streams and lakes introducing aluminum into these environments. Leaching aluminum from the soil increases the acidity of the soil. Elevated levels of aluminum can be toxic to plants and reduce crop yields.

Further, acid rain can also strip nutrients such as calcium and magnesium from soil. Acid rain falling on limestone can generate carbon dioxide and increase the carbon dioxide levels in the atmosphere.

Several approaches have been used to reduce acid rain. For example, reducing emissions of sulfur dioxide and nitrogen oxides. These emissions can be achieved by using more eco-friendly technologies such as low sulfur fuels, scrubbers, catalytic converters, and other technologies. Further, using renewable energy sources can also help reduce the release of emissions that cause acid rain.

SUMMARY

According to one illustrative embodiment, a computer implemented method for selective diffusion of acid rain is provided. A number of processor units identifies concentrations of acidic gases using a set of satellite images. The number of processor units locates hot spots on a land using the concentrations of acidic gases. The number of processor units classifies the hot spots on the land into vulnerable zones having vulnerable zone classifications. The number of processor units determines cloud seeding materials and alkaline compounds known for the vulnerable zones to selectively diffuse the acidic gases and cause precipitation in the vulnerable zones based on the vulnerable zone classifications for the vulnerable zones. According to other illustrative embodiments, a computer system and a computer program product for selective diffusion of acidic rain are provided.

BRIEF DESCRIPTION OF THE DRAWINGS

FIG. 3 is a process flow diagram illustrating selective diffusion of acid rain in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
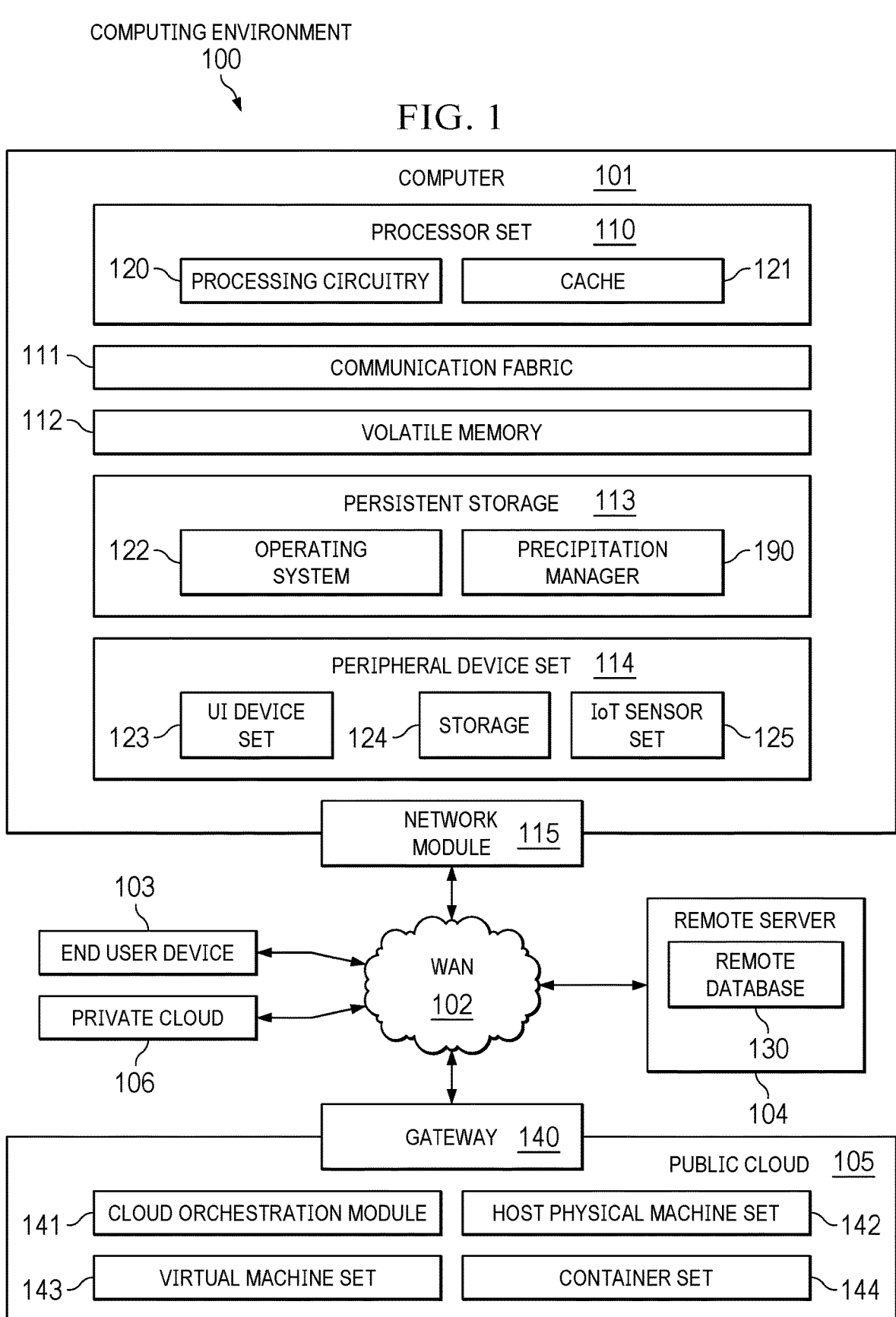
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as precipitation manager 190. In addition to precipitation manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and precipitation manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in precipitation manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in precipitation manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud seeding can be used to modify the ability of clouds to produce precipitation such as rain or snow. Current cloud seeding techniques do not take into account that acidic gases may be present in the areas in which cloud seeding is performed. Acidic gases are gases that can interact with moisture to create acid rain. As result, without knowing concentrations of acidic gases, cloud seeding can result acid rain over areas of land that are sensitive to acid rain period. Selective cloud seeding can be performed based on land use in addition to knowing concentrations of acidic gases. Further, cloud seeding be supplemented using diffusers that selectively diffuse acidic gases as part of the cloud seeding process.

In one illustrative example, a computer implemented method enables selective diffusion of acid rain. A number of processor units identifies concentrations of acidic gases using a set of satellite images. The number of processor units locates hot spots on a land using the concentrations of acidic gases. The number of processor units classifies the hot spots on the land into vulnerable zones having vulnerable zone classifications. The number of processor units determines cloud seeding materials and alkaline compounds known for the vulnerable zones to selectively diffuse the acidic gases and cause precipitation in the vulnerable zones based on the vulnerable zone classifications for the vulnerable zones. Cloud seeding materials and alkaline compounds known for vulnerable zones or compounds that can be used for the vulnerable zones to obtain the desired results. This determination of known cloud seeding materials and alkaline compounds can include determining the amount that should be used to obtain the desired results in addition to the type of cloud seeding materials and alkaline compounds.

Some vulnerable zones can benefit from moisture interacting with nitrogen oxides (NOx) before the moisture falls as precipitation. For example, forests with woody trees can use nitrogen in the precipitation to accelerate carbon sequestration. As another example, wetlands and rice paddy fields are types of vulnerable zones that generate methane. Sulfur dioxide (SO2) mixing with moisture prior to the moisture falling as precipitation can reduce methane emissions in these types of vulnerable zones.

As another example, barren lands with thick soil compositions can be used to neutralize the effects of acid rain. With these types of vulnerable zones, selected amounts of nitrogen oxide and sulfur dioxide in the acidic gases can result in precipitation occurring over barren lands as opposed to other areas that may be more sensitive. Barren lands are vulnerable zones that can neutralize nitric oxide and sulfuric acid over time depending on the soil compositions in the zones. This type of consideration of land-use can be used to selectively diffuse different types of acidic gases such that the resulting precipitation can provide a benefit to those different vulnerable zones. These and other types of considerations involving land-use and concentrations of acidic gases are not currently taken into account and used to control the acidity or composition of the precipitation.

Figure 2:
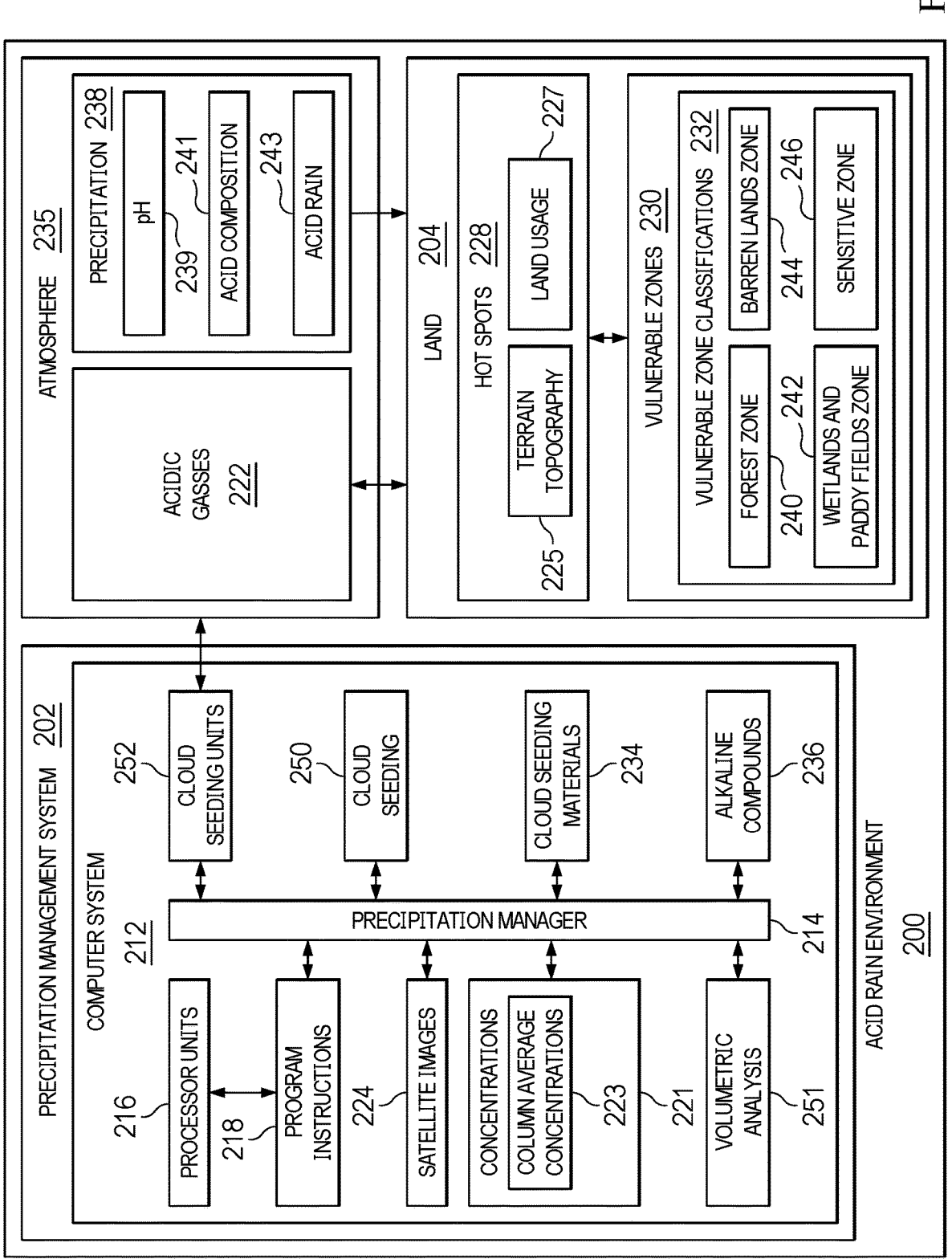
FIG. 2 is a block diagram of an acid rain environment in accordance with an illustrative embodiment.

With reference now to FIG. 2, a block diagram of an acid rain environment is depicted in accordance with an illustrative embodiment. In this illustrative example, acid rain environment 200 includes components that can be implemented in hardware such as the hardware shown in computing environment 100 in FIG. 1. In this illustrative example, precipitation management system 202 operates to manage the impact of acid rain on different geographic areas on land 204. In this illustrative example, precipitation management system 202 comprises computer system 212 and precipitation manager 214. Precipitation manager 214 is located in computer system 212. In this illustrative example, precipitation manager 214 may be implemented using precipitation manager 190 in FIG. 1.

Precipitation manager 214 can be implemented in software, hardware, firmware or a combination thereof. When software is used, the operations performed by precipitation manager 214 can be implemented in program instructions configured to run on hardware, such as a processor unit. When firmware is used, the operations performed by precipitation manager 214 can be implemented in program instructions and data and stored in persistent memory to run on a processor unit. When hardware is employed, the hardware can include circuits that operate to perform the operations in precipitation manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, precipitation manager 214 identifies concentrations 221 of acidic gases 222 using a set of satellite images 224. As used herein, a "set of" when used with reference items means one or more items. For example, a set of satellite images 224 is one or more of satellite images 224. In this illustrative example, the acidic gases 222 are any gases that can increase acidity of rain. In other words, gases that can interact with moisture in a manner produces the pH of the moisture such that rain for the moisture has a lower pH than if acidic gases 222 did not interact with the moisture. The acidic gases can include, for example, nitrogen oxide (NOx), sulfur dioxide (SO2), hydrogen chloride (HCL), hydrogen fluoride (HF), and other types of acidic gases.

In this example, the satellite images can be analyzed to determine concentrations 221 of the acidic gases 222. In the list of examples, satellites can include sensors such as spectrometers or hyperspectral imagers. These sensors can generate satellite images 224 with different wavelengths. Different gases can absorb different wavelengths. The wavelength absorption can be used to identify the concentration of different acidic gases. These images can be analyzed with atmospheric chemistry modeling to determine concentrations. These types of models can simulate the behavior and dispersion of gases in the atmosphere based on known sources of the gases, transport mechanisms, and chemical reactions. The models can be used to estimate the concentration gases in different regions. These estimations can be compared with the measurements in the satellite images to increase the ability to identify concentrations 221 of the acidic gases 222.

In one illustrative example, concentrations 221 can be column average concentrations 223 for the acidic gases 222. Column average concentrations 223 can be the average concentration of the acidic gases 222 throughout a vertical column in the atmosphere. This type of measurement can provide an idea of the distribution of acidic gases 222 vertically. When column average concentrations 223 are identified over a region of land 204, a three dimensional identification of the distribution of the acidic gases 222 over land 204 can be determined.

In this illustrative example, precipitation manager 214 locates hot spots 228 on land 204 using concentrations 221 of acidic gases 222. Example, these hotspots can be for regions or areas of land 204. This example, hot spots 228 can be areas over land 204 where concentrations 221 of acidic gases 222 to or greater than some threshold. In this example, the threshold can be determining a number of different ways. For example, the threshold is based on when concentrations 221 of the acidic gases 222 can result in precipitation in the form of acid rain having pH levels that can be harmful to land 204.

Precipitation manager 214 classifies hot spots 228 on land 204 into vulnerable zones 230 having vulnerable zone classifications 232. In this illustrative example, the classification can be performed based on the land use of land 204 in which hot spots 228 are located. For example, precipitation manager 214 can classify hot spots 228 by identifying terrain topography 225 and land usage 227 in hot spots 228. Using these determinations, precipitation manager 214 can classify hot spots 228 into vulnerable zones 230 having vulnerable zone classifications 232 using terrain topography 225 and land usage 227 identified in hot spots 228.

In this example, vulnerable zones 230 can have vulnerable zone classifications 232 selected from a group comprising forest zone 240, wetlands and paddy fields zone 242, barren lands zone 244, and sensitive zone 246. In this example, forest zone 240 is a forest area containing trees. Wetlands and paddy fields zone 242 is an area of land 204 containing wetlands and paddy fields. Barren lands zone 244 are portions of land 204 that are not being used for agriculture and do have forests or other valuable types of vegetation. Sensitive zone 246 can be areas of land 204 that are, for example, agricultural area, a federally protected area, an aquatic area, a mountainous area, urban area, a suburban area, an area with historical or cultural buildings or monuments, or other areas that are sensitive to acid rain.

Precipitation manager 214 determines cloud seeding materials 234 and alkaline compounds 236 known for vulnerable zones 230 to selectively diffuse acidic gases 222 and cause precipitation 238 to fall from atmosphere 235 onto land 204 in vulnerable zones 230 based on vulnerable zone classifications 232 for vulnerable zones 230. In this illustrative example, these different vulnerable zone classifications can be based on at least one of land use, soil composition, and other factors regarding land 204.

Further, in this example, diffusing acidic gases 222, such as nitrogen oxides (NOx) and sulfur dioxide (SO2), means that the selected alkaline compounds react with and effectively remove or neutralize nitrogen oxides or sulfur dioxide by introducing alkaline compounds into acidic gases 222, resulting in the formation of soluble salts. The nitrogen oxides or sulfur dioxide can react with the alkali metal compounds to form these salts.

In the illustrative example, the type and amount of cloud seeding materials 234 and alkaline compounds 236 are selected based on vulnerable zone classification for a particular vulnerable zone. For example, the amount and type of alkaline compounds 236 can be selected based on how much diffusing of nitric oxide and sulfur dioxide is desired in acidic gases 222 when cloud seeding 250 is performed. The amount of these different gases diffused depends on the particular type of vulnerability zone for vulnerable zone.

These determinations can be made by precipitation manager 214 performing volumetric analysis 251 for each of vulnerable zones 230 to determine a mixture of cloud seeding materials 234 and alkaline compounds 236 to selectively diffuse the acidic gases 222. In this illustrative example, volumetric analysis 251 is a quantitative chemical analysis in which the amount of the substance, such as an alkaline compound, is determined by measuring the volume occupied by that substance. This type of analysis is also referred to as a titrimetric analysis. This analysis can include measuring volumes of reagents that react with an analyte in a chemical reaction having a known stoichiometry. Volumetric analysis 251 is performed to reach an equivalence point where the stoichiometric ratio between the analyte and the reagent is achieved.

For example, forest zone 240 can benefit from acid rain 243 containing higher amounts of nitrogen. This nitrogen can be in the form nitric acid and acid rain 243. Nitrogen can be used to accelerate carbon sequestration by trees in forest zone 240. As a result, alkaline compounds 236 can be selected to diffuse some of the nitric oxide's and neutralize sulfur oxides in the acidic gases 222.

As another example, wetlands and paddy fields zone 242 are areas in which methane emissions can occur. Based on the expected level been emissions, alkaline compounds 236 can be selected to partially diffuse sulfur dioxide and to neutralize nitric oxides in the acidic gases 222.

As yet another example, with barren lands zone 244, alkaline compounds 236 can be selected to partially diffuse both nitric oxides and sulfur dioxide in acidic gases 222. This partial diffusion these two compounds can be selected such that acid rain containing nitric acid caused by nitric oxide and sulfuric acid caused by sulfur oxide can be at a level that can be neutralized by barren lands zone 244.

In still another illustrative example, for sensitive zone 246 alkaline compounds 236 are selected to completely neutralize as much of nitric oxides and the sulfur dioxide as possible in acidic gases 222. The neutralization is desirable to increase pH 239 in precipitation 238 to avoid precipitation 238 from becoming acid rain 243.

With the determination of cloud seeding materials 234 and alkaline compounds 236 known for use in vulnerable zones 230 having vulnerable zone classifications 232, precipitation manager 214 can perform cloud seeding 250 using cloud seeding units 252. In the illustrative example, cloud seeding units 252 can be selected from at least one of the drone, a fixed wing aircraft, a glider, an airship, a helicopter, or other suitable type of aerial vehicle. In other examples, cloud seeding units 252 can be ground or aquatic vehicles for systems.

In this example, cloud seeding 250 with cloud seeding materials 234 and alkaline compounds 236 to selectively diffuse acidic gases 222 and causes precipitation 238 in vulnerable zones 230 based on vulnerable zone classifications 232 for vulnerable zones 230 performed using cloud seeding units 252. In other words, the particular amounts and combinations of cloud seeding materials 234 and alkaline compounds 236 can be delivered to different ones of vulnerable zones 230 by cloud seeding units 252 based on vulnerable zone classifications 232 of vulnerable zones 230. As result, precipitation 238 can have pH 239 that varies based on the materials used. In other words, precipitation 238 can follow as acid rain 243 in which pH 239 and acid composition 241 can vary depending on the amount of cloud seeding materials 234 and the amount and type of alkaline compounds 236 used.

In one illustrative example, one or more technical solutions are present that overcome a problem with managing acid rain. As a result, one or more solutions may provide an ability to perform selective diffusion of acid rain. In the different illustrative examples, the selective diffusion involves reducing the concentration of selected types of acidic gases. The resulting precipitation can have a composition that is beneficial to the particular vulnerable zone in which the precipitation falls.

Computer system 212 can be configured to perform at least one of the steps, operations, or actions described in the different illustrative examples using software, hardware, firmware or a combination thereof. As a result, computer system 212 operates as a special purpose computer system in which precipitation manager 214 in computer system 212 enables performing selective diffusion of acid rain.

In the illustrative example, the use of precipitation manager 214 in computer system 212 integrates processes into a practical application for selective diffusion of acid rain that identifies hotspots from concentrations of acidic gases, classifies the hotspots into vulnerable zones, and determines cloud seeding materials and alkaline compounds known for vulnerable zones based on the types of vulnerable zones present.

The illustration of acid rain environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although four vulnerable zone classifications 232 are depicted, the depiction of these four types of vulnerable zones is not meant to limit the manner in which other illustrative examples can be implemented. For example, other numbers of vulnerable zone classifications 232 can be present in addition to or in place of the ones depicted in this example. For example, other types of vulnerable zone classifications can include an urban zone, a suburban zone, a manufacturing zone, a farmland zone, a cattle zone, and other suitable types of zones.

Turning next to FIG. 3, a process flow diagram illustrating selective diffusion of acid rain is depicted in accordance with an illustrative embodiment. The data flow in this figure can be implemented precipitation manager 214 in precipitation management system 202. In this example, geolocation boundary 300 and satellite images 302 are inputs. Geolocation boundary 300 defines an area of interest for the analysis. Geolocation boundary 300 can be based on at least one of a political boundary, economic boundaries, physical boundaries, and other types of boundaries on the land. In this example, satellite images 302 can include satellite spectral images, multispectral images, hyperspectral images, microwave images.

Gas concentration and pH identification 306 uses geolocation boundary 300 and satellite images 302 as inputs to determine perform gas concentration of nitric oxide (NOx), sulfur dioxide (SO2), and the pH within geolocation boundary 300.

This example, satellite images 302 can provide information about a spectrum of colors reflected by gases, particles, and moisture in the atmosphere. Satellite images 302 can be used in a spectroscopy analysis to determine concentrations of these gases. This analysis can be used to determine the presence of specific elements or compounds such as nitric oxide and sulfur dioxide. Further, this analysis can be used to determine the concentration of these gases. Further, the presence of these gases can also be used to determine the pH of moisture in the air in gas concentration in pH identification 306.

With identification of concentrations for nitric oxide and sulfur dioxide, hotspot identification 308 identifies areas within geolocation boundary 300 that are considered to be hotspots. In this example, hotspots concentrations of nitric oxide and sulfur dioxide exceed a threshold concentration level.

With identification of hotspots, vulnerable zone classification 310 classifies the hotspots into vulnerable zones having vulnerable zone classifications. This classification can be performed using satellite images 302 and land data 304. This example, land data 304 can include terrain topology and land usage type. The vulnerable zone classifications can be, for example, a forest zone, a wetlands and rice paddy fields zone, a barren lands zone, and a sensitive zone.

With the classification of hotspots into vulnerable zones having vulnerable zone classifications, cloud seeding material and alkaline compounds estimation 312 estimates cloud seeding and alkaline compounds known for use in each of the classified vulnerable zones. The estimation for each of the vulnerable zones includes the amount and type of cloud seeding material and the amount and type of alkaline compounds known for each vulnerable zone based on the classification of that vulnerable zone.

The estimation performed by cloud seeding material and alkaline compounds estimation 312 can be made using atmospheric data 314, vulnerable zone parameters 316, threshold limits 318, alkaline neutralizer compounds knowledge base 320, cloud seeding systems knowledge base 322. In this example, atmospheric data 314 can include, for example, precipitation, humidity, wind speed and direction, temperature, and pressure. Vulnerable zone parameters 316 includes predicted methane emission for wetlands and rice paddy fields and nitrogen requirements for woody forest. This information can be edified for locations that may be found in vulnerable zones.

In this example, threshold limits 318 provides threshold limits for nitric oxide, sulfur dioxide, and pH for each vulnerable zone. These threshold limits the find the maximum concentrations for nitric oxide and sulfur dioxide. Further, threshold limits can also define the desired pH range or threshold for acidity within the pH.

Cloud seeding systems knowledge base 322 identifies information about cloud seeding. This information can include seeding systems, seeding methods, seeding materials, and other information. For example, the seeding type is the manner in which seeding is performed. Seeding systems can include ground-based or aircraft based systems. Seeding methods can include flare seeding, hygroscopic seeding, glaciogenic seeding, cloud seeding, warm cloud seeding. Seeding materials can include, for example, potassium iodide, silver iodide, dry ice, salt crystals, calcium chloride, liquid propane, acetone, and other suitable materials.

In this example, environmental benefit analysis 330 determines the benefit versus the cost for performing cloud seeding in the different vulnerable zones. The cost versus benefit includes an analysis of the impact that cloud seeding has versus the cost for cloud seeding using the cloud seeding material and alkaline compounds to diffuse nitrogen oxide and sulfur oxide.

This analysis can be performed based on the amount of material identified by cloud seeding material and alkaline compounds estimation 312. The amount of material can be used to determine costs. Further, the gas concentrations and pH identified by gas concentration and pH identification 306 can be used to determine the impact for particular zones based on the classification of those zones as determined by vulnerable zone classification 310. If the environmental benefit analysis indicates that the impact is worth the cost, seeding unit deployments 332 deploys cloud seeding units with the cloud seeding material and one compounds identified. These seeding units are sent to the different vulnerable zones containing the cloud seeding material and alkaline compounds known for each zone to obtain the desired result.

Figure 4:
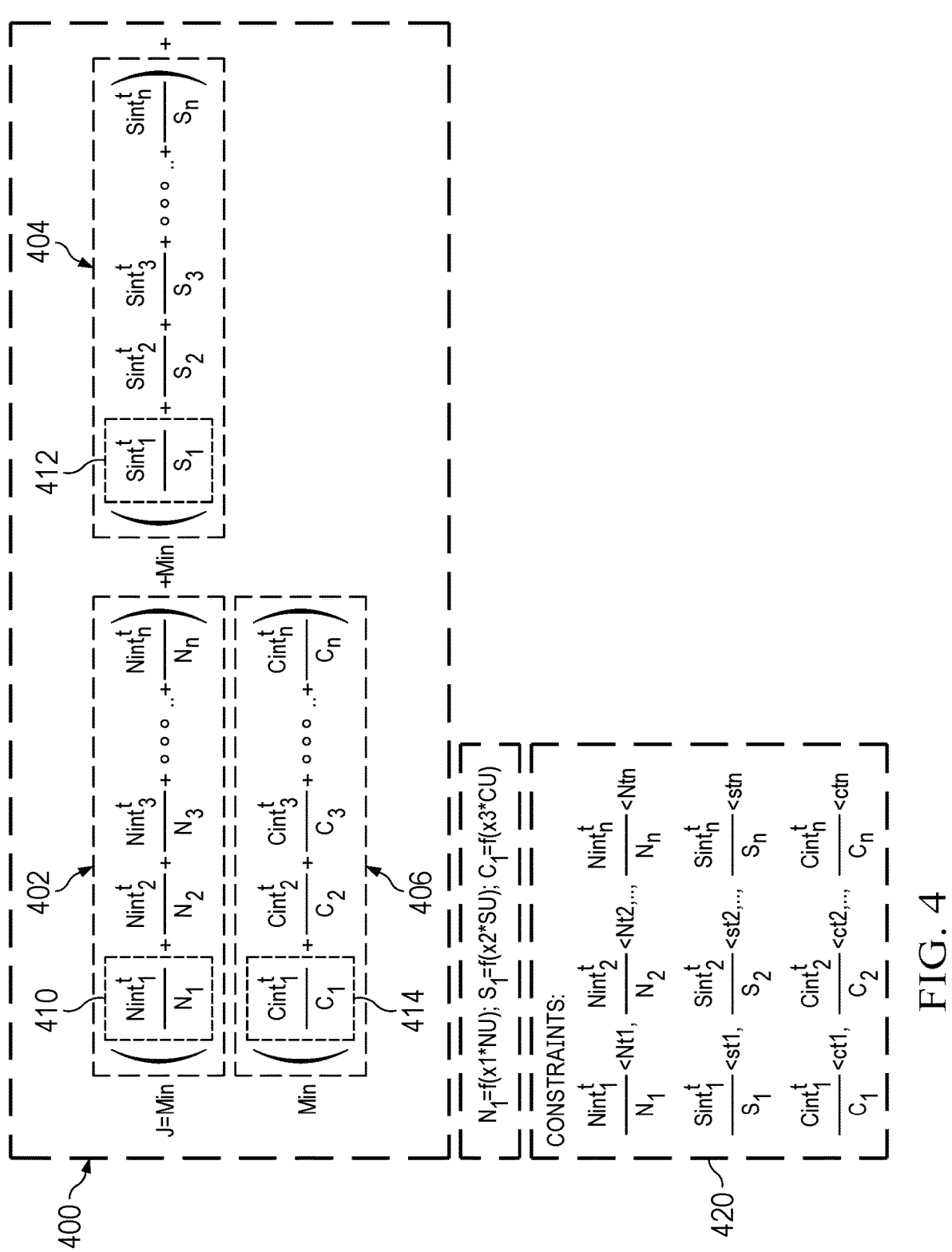
FIG. 4 is a volumetric analysis in accordance with an illustrative embodiment.

Turning next to FIG. 4, a volumetric analysis is depicted in accordance with an illustrative embodiment. In this illustrative example, volumetric equation 400 is used to determine an amount of seeding materials and alkaline compounds known for vulnerable zones to selectively diffuse a set of gases. In this example, the volumetric analysis is for nitrogen oxides (NOx) and sulfur dioxide (SO2).

As depicted, volumetric equation 400 is used to determine an optimal number of NOx and SO2 diffuse units and cloud seeding units needed to provide desired results in different vulnerable zones. In this example, volumetric equation 400 comprises NOx terms 402. SO2 terms 404, and seeding terms 406 that are minimized to determine the amount of seeding materials and alkaline compounds needed for vulnerable zones that have been selected for selective diffusion of acid rain.

In this example, $$N int_i^t$$

represents an intensity of NOx for a vulnerable zone i at time t. $N_i$ represents the amount of alkaline material needed to reduce intensity of NOx by one unit of for that vulnerable zone i.

$$S int_i^t$$

represents the intensity of SO2 for a vulnerable zone i at time t. $S_i$ represents the amount of alkaline material needed to reduce the intensity of SO2 by one unit in vulnerable zone i.

$$C int_i^t$$

represents the pH differential between the desired pH and the actual pH for a vulnerable zone i at time t, $C_i$ represents the amount of seeding material needed change the pH by one in vulnerable zone i. In this example, i is an index for vulnerable zones that is separate from 1 to n, where in the number of vulnerable zones to be analyzed.

For term 410, $N_1=f(x1*NU)$. In term 412, $S_1=f(x1*SU)$, and in term 414, $C_1=f(x3*CU)$ in term 414. In this example, NU is a NOx neutralizing unit and x1 is the number of units. In this example, x1 is selected such that the number of NUs can neutralize NOx by one unit of intensity in $$N int_1^t.$$

SU is a SO2 neutralizing unit and x2 is the number of units. The value of x2 is selected such that the number of SUs can neutralize SO2 by one unit of intensity $$Sint_1^t.$$

CU is a cloud seeding unit and x3 is the number of units. In this example, x3 is selected such that the number of CUs can change the pH in $$Cint_1^t$$

by one. These units are amounts of materials that can be used to express concentrations and can be moles per liter or molarity.

As a result, the analysis using volumetric equation 400 determines the number of $N_i$ and $S_i$ diffuse the desired amount of NOx and SO2 in each of the vulnerable zones to a desired level as described above. This equation is also used to determine the number of Ci needed to reach the desired pH level in each of the vulnerable zones.

In reducing the intensities and changing the pH is much as possible to reach desired level, constraints 420 can be used with volumetric equation 400. These constraints are set to provide limits to the amount of neutralizing units and cloud seeding units used. As depicted, constraints 420 can be different for each vulnerable zone.

Figures 5, 6:
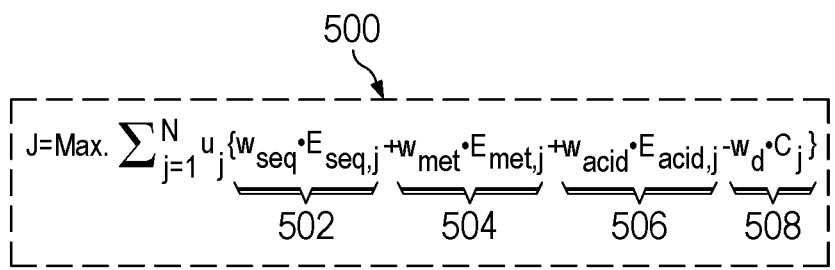
FIG. 5 is an illustration of cost function in accordance with an illustrative embodiment.
FIG. 6 is an environmental gain map in accordance with an illustrative embodiment.

In FIG. 5, an illustration of cost function is depicted in accordance with an illustrative embodiment. As depicted, cost function (J) 500 can be selected such that the benefit for vulnerable zones selected for selective diffusion of acid rain can be optimized. In this illustrative example, cost function (J) 500 is maximized for N vulnerable zones. This maximization is performed using the following terms: carbon sequestration term 502, methane reduction term 504, acid rain impact reduction 506, and deployment cost 508.

In cost function (J) 500, $u_j$ is a binary decision variable (optimal identified vulnerable zone pixel 'j'), $E_{seq,j}$ is the increase in carbon sequestration for a forest zone at pixel 'j, $E_{met,j}$ is methane reduction from wetlands and rice paddy fields zone at pixel 'j', $E_{acid,j}$ is a reduction in acid rain impacts at pixel 'j', and $C_j$ is the cost of deploying cloud seeding units with optimal cloud seeding and NOx and SO2 neutralizing units at pixel 'j', w_seq, w_met, w_acid, w_D are weighing coefficients for additional photosynthetic activity by clearing aerosol in the atmosphere and cleaning the dust on the leaves, and the expense for cloud seeding respectively.

In this illustrative example, if the benefit is greater than the cost, then $u_j$ is set equal to one. If the benefit is not greater than the cost, $u_j$ is set equal to 0. With this example, a 1 indicates that cloud seeding will be performed using cloud seeding materials and NOx and SO2 neutralizing units at the particular vulnerability zone at pixel j. In this example, a 0 means that cloud seeding will not be performed at the particular vulnerability zone at pixel j.

In this example, the optimization is performed to increase carbon sequestration for forest zones using carbon sequestration term 502. Additionally, methane reduction term 504 is used to reduce methane from wetlands and rice paddy fields zones. Acid rain impact reduction 506 is used to reduce the impact of acid rain. Deployment cost 508 represents the cost for deploying cloud seeding units such as drones carrying seeding materials and nitric oxides (NOx) and sulfur dioxide (SO2) neutralizing units. The goal is to maximize the benefit in view of the cost to deploy the materials.

With reference next to FIG. 6, an environmental gain map is depicted in accordance with an illustrative embodiment. In this illustrative example, environmental gain map 600 visually depicts spatially distributed environmental gain in terms of carbon offset through carbon sequestration, carbon avoidance through methane reduction, and acid rain reduction. This map is a pixel map in which each pixel represents a vulnerable zone for which environmental gain has been calculated.

The value of environmental gain for each of these pixels can be determined using cost function (J) 500 in FIG. 5. Whether cloud seeding using cloud seeding materials and alkaline compounds is performed for a particular pixel in environmental gain map 600, is determined by the $u_j$ associated with each gain value from cost function (J) 500. As depicted, some vulnerability zones can benefit more from cloud seeding using cloud seeding materials and alkaline compounds than others of vulnerability zones.

Figure 7:
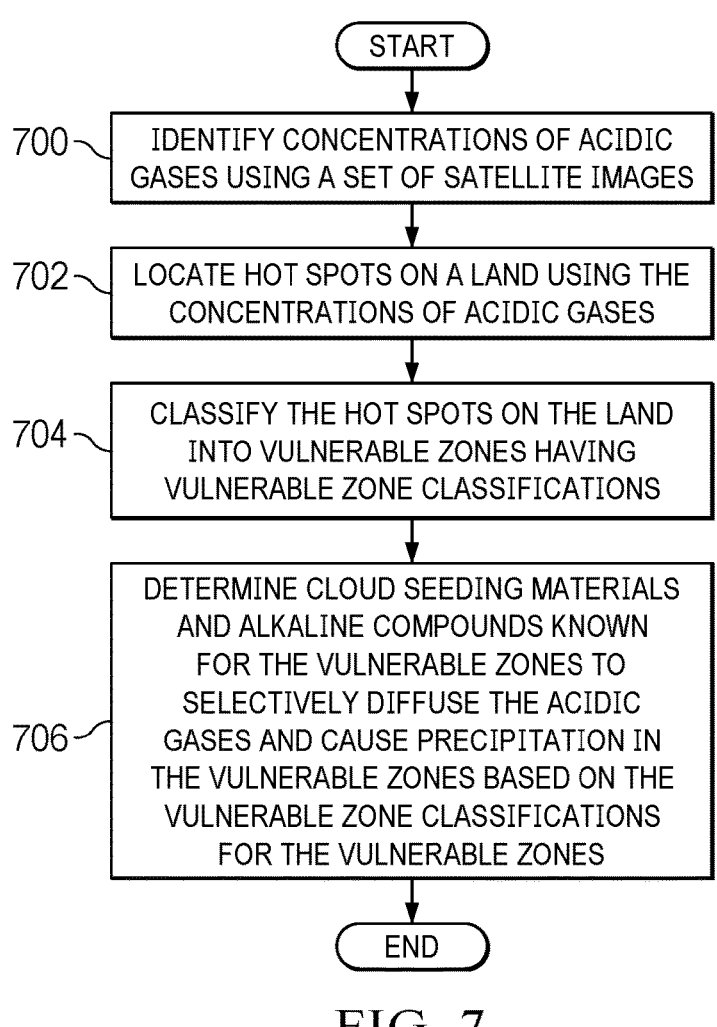
FIG. 7 is a flowchart of a process for selective diffusion of acid rain in accordance with an illustrative embodiment.

Turning next to FIG. 7, a flowchart of a process for selective diffusion of acid rain is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in precipitation manager 214 in computer system 212 in FIG. 2.

The process begins by identifying concentrations of acidic gases using a set of satellite images (step 700). The process locates hot spots on a land using the concentrations of acidic gases (step 702).

The process classifies the hot spots on the land into vulnerable zones having vulnerable zone classifications (step 704). The process determines cloud seeding materials and alkaline compounds known for the vulnerable zones to selectively diffuse the acidic gases and cause precipitation in the vulnerable zones based on the vulnerable zone classifications for the vulnerable zones (step 706). The process terminates thereafter.

Figure 8:
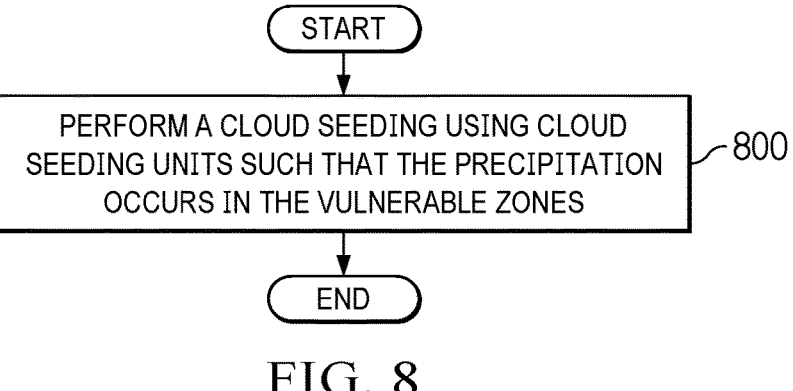
FIG. 8 is a flowchart of a process for performing cloud seeding in accordance with an illustrative embodiment.

With reference now to FIG. 8, a flowchart of a process for performing cloud seeding is depicted in accordance with an illustrative embodiment. The step in this flowchart is an example of an additional step that can be performed with the steps in FIG. 7.

The process performs a cloud seeding using cloud seeding units such that the precipitation occurs in the vulnerable zones (step 800). The process terminates thereafter. In step 800, the cloud seeding with the cloud seeding materials and alkaline compounds to selectively diffuse the acidic gases causes the precipitation in the vulnerable zones based on vulnerable zone classifications for the vulnerable zones. In this example, the alkaline compounds are selected to neutralize particular acidic gases. These alkaline compounds can react with the acidic gases resulting in a neutralization of the acidic compounds in these gases.

For example, for diffusing nitrogen oxides (NOx), the following alkaline compounds can be used: urea (CO(NH2) 2), ammonium bicarbonate (NH4HCO3), ammonium hydroxide (NH4OH), and ammonium carbonate ((NH4) 2CO3), and other suitable alkaline compounds. In diffusing sulfur oxide (SO2), the following are some examples of alkaline compounds that can be used: calcium carbonate (CaCO3), magnesium hydroxide (Mg(OH)2), sodium bicarbonate (NaHCO₃), and other suitable compounds. The selection of suitable alkaline compounds can be based on effectiveness of reducing particular acidic gases and environmental friendliness.

Figure 9:
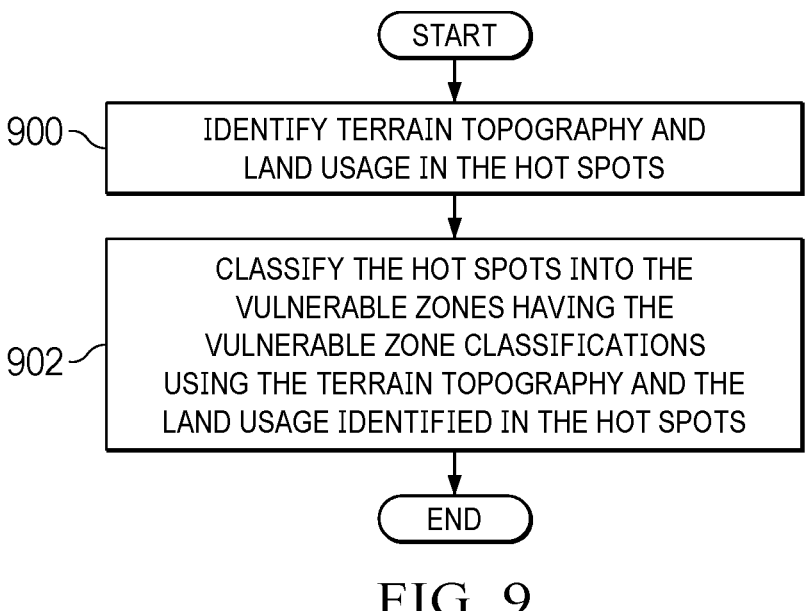
FIG. 9 is a flowchart of a process for classifying hotspots in accordance with an illustrative embodiment.

In FIG. 9, a flowchart of a process for classifying hotspots is depicted in accordance with an illustrative embodiment. The process in this flowchart is an example of an implementation of step 704 in FIG. 7.

The process identifies terrain topography and land usage in the hot spots (step 900). The process classifies the hot spots into the vulnerable zones having the vulnerable zone classifications using the terrain topography and the land usage identified in the hot spots (step 902). The process terminates thereafter.

Figure 10:
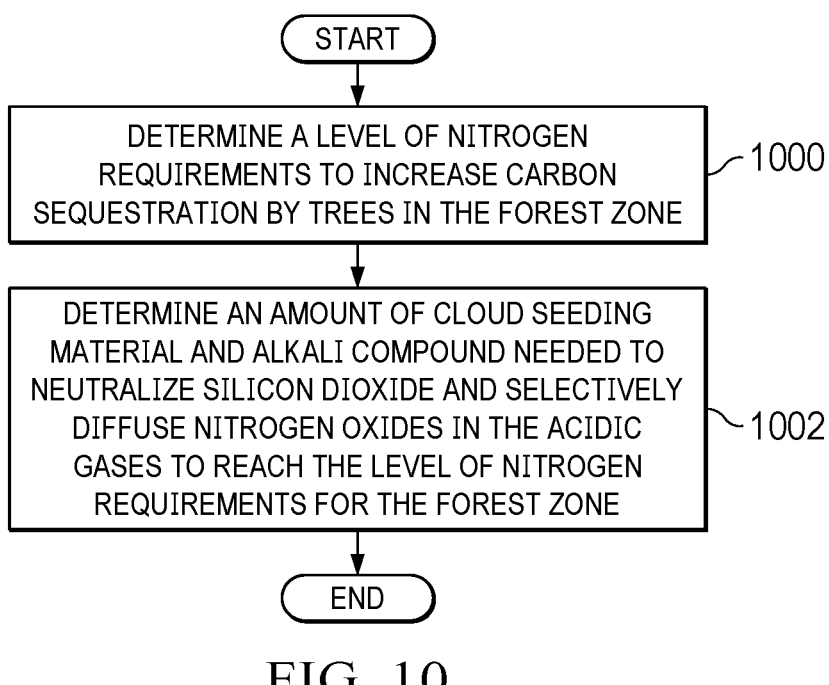
FIG. 10 is a flowchart of a process for determining cloud seeding materials and alkaline compounds for a forest zone in accordance with an illustrative embodiment.

With reference to FIG. 10, a flowchart of a process for determining cloud seeding materials and alkaline compounds for a forest zone is depicted in accordance with an illustrative embodiment. The process in FIG. 10 is an example of one implementation for step 706 in FIG. 7.

The process determines a level of nitrogen requirements to increase carbon sequestration by trees in the forest zone (step 1000). The process determines an amount of cloud seeding material and alkali compound needed to neutralize sulfur dioxide and selectively diffuse nitrogen oxides in the acidic gases to reach the level of nitrogen requirements for the forest zone (step 1002). The process terminates thereafter.

Figure 11:
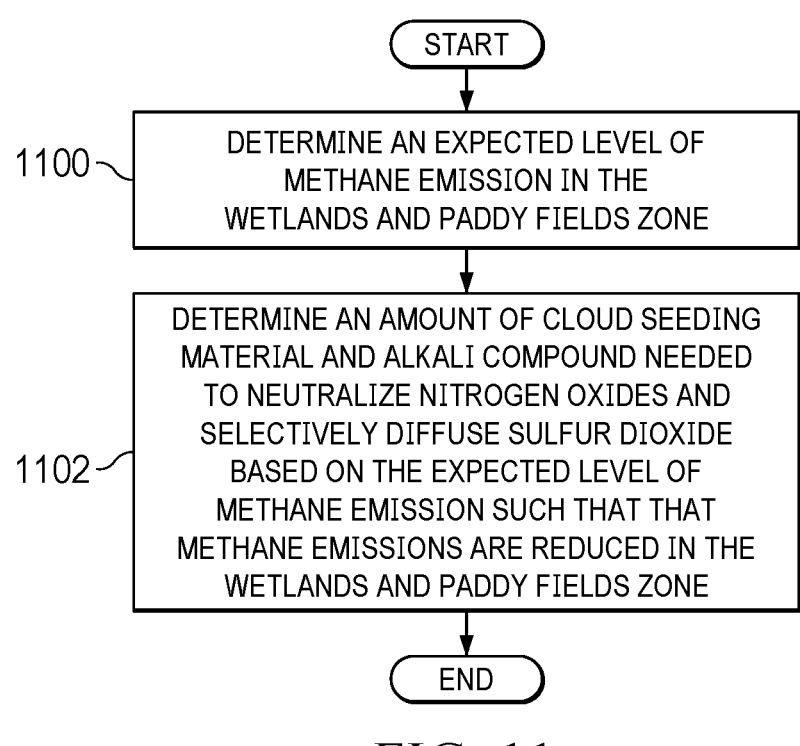
FIG. 11 is a flowchart of a process for determining cloud seeding materials and alkaline compounds for a wetlands and paddy fields zone in accordance with an illustrative embodiment.

With reference to FIG. 11, a flowchart of a process for determining cloud seeding materials and alkaline compounds for a wetlands and paddy fields zone is depicted in accordance with an illustrative embodiment. The process in this figure is an example of one implementation for step 706 in FIG. 7.

The process determines an expected level of methane emission in the wetlands and paddy fields zone (step 1100). The process determines an amount of cloud seeding material and alkali compound needed to neutralize nitrogen oxides and selectively diffuse sulfur dioxide based on the expected level of methane emission such that that methane emissions are reduced in the wetlands and paddy fields zone (step 1102). The process terminates thereafter.

Figure 12:
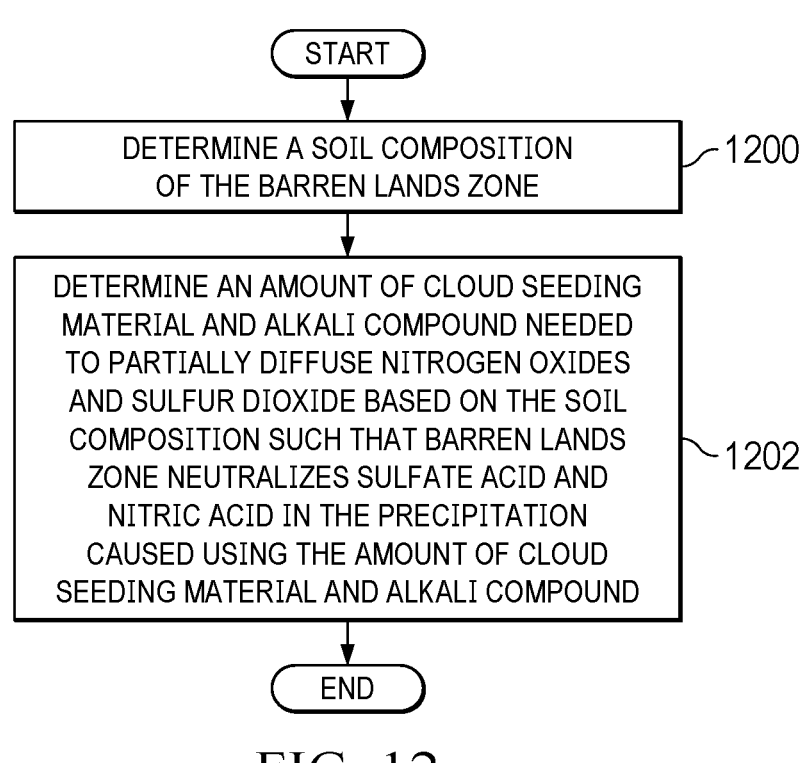
FIG. 12 is a flowchart of a process for determining cloud seeding materials and alkaline compounds for a barren lands zone in accordance with an illustrative embodiment.

With reference next to FIG. 12, a flowchart of a process for determining cloud seeding materials and alkaline compounds for a barren lands zone is depicted in accordance with an illustrative embodiment. The process in this figure is an example of one implementation for step 706 in FIG. 7.

The process determines a soil composition of the barren lands zone (step 1200). In step 1200, different soil compositions can have different abilities to neutralize acid rain containing nitric acid created from nitric oxides and sulfuric acid created from sulfur dioxide. Identifying the soil composition can indicate the level of acidity for the acid rain that can be neutralize by the soil in a barren lands zone.

The process determines an amount of cloud seeding material and alkali compound needed to partially diffuse nitrogen oxides and sulfur dioxide based on the soil composition such that barren lands zone neutralizes sulfate acid and nitric acid in the precipitation caused using the amount of cloud seeding material and alkali compound (step 1202). The process terminates thereafter.

Figure 13:
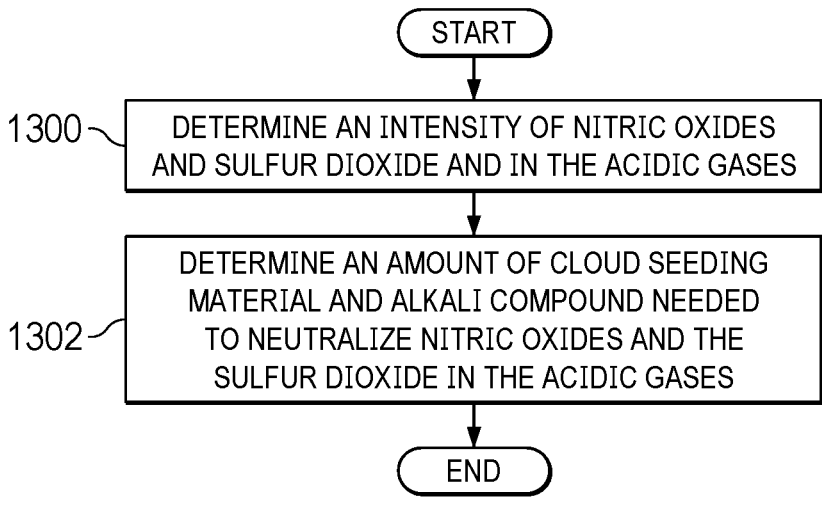
FIG. 13 is a flowchart of a process for determining cloud seeding materials and alkaline compounds for a sensitive zone in accordance with an illustrative embodiment.

Turning now to FIG. 13, a flowchart of a process for determining cloud seeding materials and alkaline compounds for a sensitive zone is depicted in accordance with an illustrative embodiment. The process in this figure is an example of one implementation for step 706 in FIG. 7.

The process determines an intensity of nitric oxides and sulfur dioxide and in the acidic gases (step 1300). The process determines an amount of cloud seeding material and alkali compound needed to neutralize nitric oxides and the sulfur dioxide in the acidic gases (step 1302). The process terminates thereafter. In the processes in FIGS. 10-13, determining the amount of cloud seeding materials and alkaline compounds also includes determining the type of cloud seeding materials and alkaline compounds to use. For example, the amount of alkaline compounds that reduces nitric oxide in a forest zone can be less than the amount of alkaline compounds that reduces sulfur dioxide.

Figure 14:
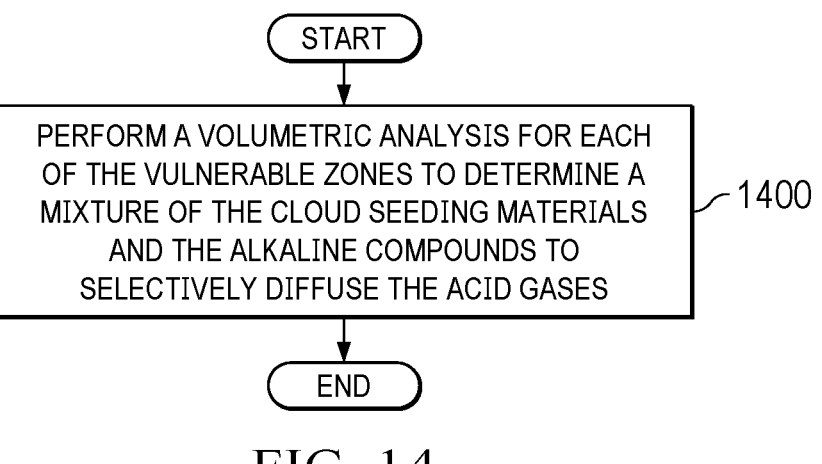
FIG. 14 is a flowchart of a process for determining cloud seeding materials and alkaline compounds in accordance with an illustrative embodiment.

With reference to FIG. 14, a flowchart of a process for determining cloud seeding materials and alkaline compounds is depicted in accordance with an illustrative embodiment. The process in FIG. 14 is an example of one implementation for step 706 in FIG. 7.

The process performs a volumetric analysis for each of the vulnerable zones to determine a mixture of the cloud seeding materials and the alkaline compounds to selectively diffuse the acid gases (step 1400). The process terminates thereafter. In this example, step 1400 can be performed using a volumetric equation such as volumetric equation 400 in FIG. 4.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 15:
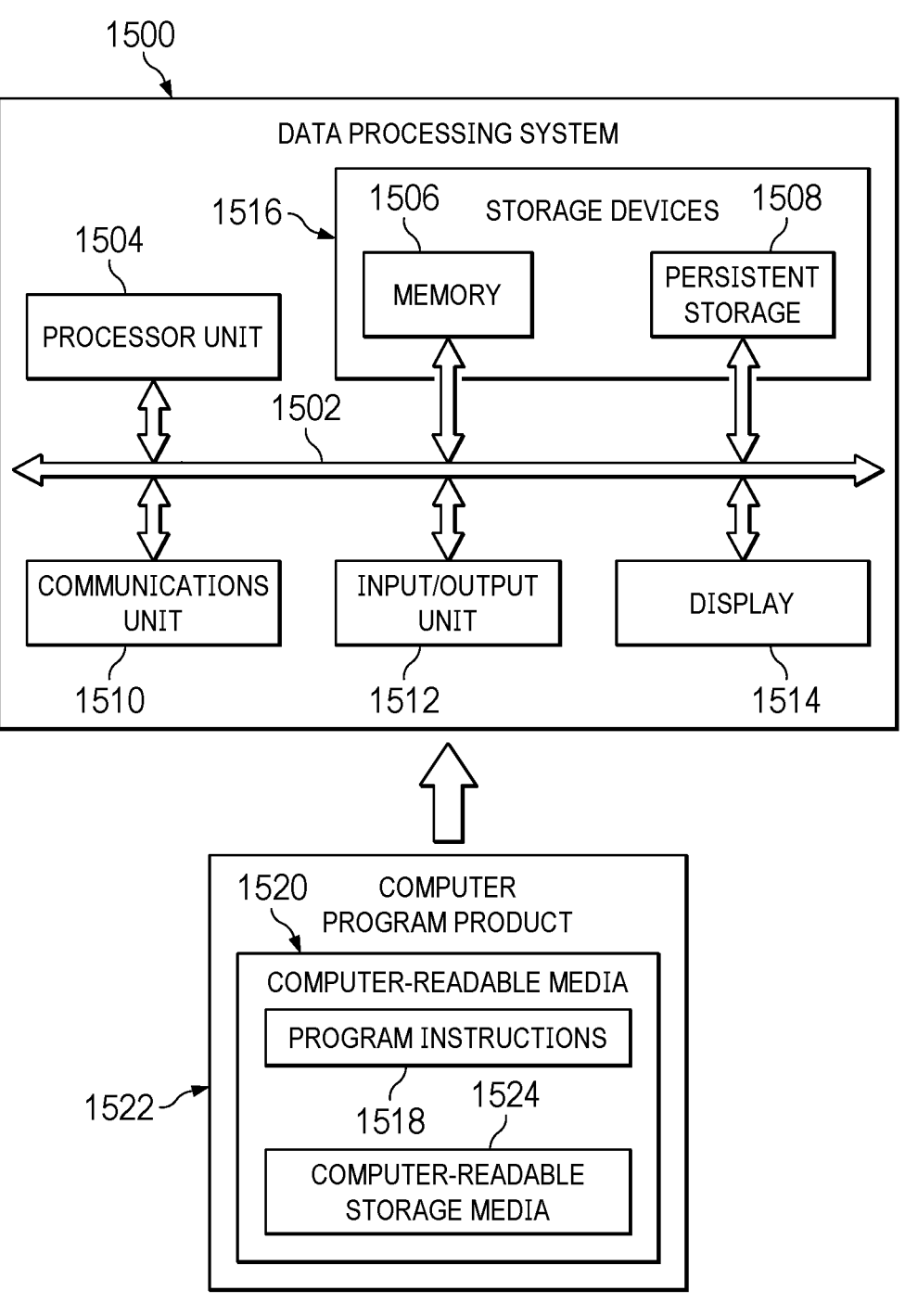
FIG. 15 is a block diagram of a data processing system in accordance with an illustrative embodiment.

Turning now to FIG. 15, a block diagram of a data processing system is depicted in accordance with an illustrative embodiment. Data processing system 1500 can be used to implement computers and computing devices in computing environment 100 in FIG. 1. Data processing system 1500 can also be used to implement computer system 212 in FIG. 2. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may also be referred to as computer readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer readable program instructions that can be read and executed by a processor in processor unit 1504. The program instructions in the different embodiments can be embodied on different physical or computer readable storage media, such as memory 1506 or persistent storage 1508.

Program instructions 1518 are located in a functional form on computer readable media 1520 that is selectively removable and can be loaded onto or transferred to data processing system 1500 for execution by processor unit 1504. Program instructions 1518 and computer readable media 1520 form computer program product 1522 in these illustrative examples. In the illustrative example, computer readable media 1520 is computer readable storage media 1524.

Computer readable storage media 1524 is a physical or tangible storage device used to store program instructions 1518 rather than a medium that propagates or transmits program instructions 1518. Computer readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1518 can be transferred to data processing system 1500 using a computer readable signal media. The computer readable signal media are signals and can be, for example, a propagated data signal containing program instructions 1518. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1520" can be singular or plural. For example, program instructions 1518 can be located in computer readable media 1520 in the form of a single storage device or system. In another example, program instructions 1518 can be located in computer readable media 1520 that is distributed in multiple data processing systems. In other words, some instructions in program instructions 1518 can be located in one data processing system while other instructions in program instructions 1518 can be located in one data processing system. For example, a portion of program instructions 1518 can be located in computer readable media 1520 in a server computer while another portion of program instructions 1518 can be located in computer readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, the illustrative embodiments provide a computer implemented method, computer system, and computer program product for selective diffusion of acid rain. In one illustrative example, a computer implemented method provides selective diffusion of acid rain. A number of processor units identifies concentrations of acidic gases using a set of satellite images. The number of processor units locates hot spots on a land using the concentrations of acidic gases. The number of processor units classifies the hot spots on the land into vulnerable zones having vulnerable zone classifications. The number of processor units determines cloud seeding materials and alkaline compounds know for use the vulnerable zones to selectively diffuse the acidic gases and cause precipitation in the vulnerable zones based on the vulnerable zone classifications for the vulnerable zones.

As a result, one or more illustrative examples enable selective diffusion of acid rain to increase environmental benefits. In the illustrative examples, precipitation with different pHs can be selectively generated based on controlling concentrations of acidic gases and land use. The concentrations of the acidic gases can be controlled using alkaline compounds selectively diffuse the city gases such that the concentration of compounds the precipitation can be tailored to particular vulnerable zones. These vulnerable zones include increasing the amount of nitrogen delivered nitric acid while reducing the amount of severity acid precipitation for forest zones.

As another example, the amount of nitrogen oxides (NOx) can be reduced or neutralized while sulfur dioxide (SO2) is partially reduced for precipitation that is to occur over a wetlands and rice paddy fields zone. As result, methane emissions from this type of zone can be reduced. This type of selective defusing of the acidic gases can be performed to result in other combinations of the acid gases resulting in precipitation as components tailored to a particular vulnerable zone. This tailoring of the precipitation can also include setting a particular pH or range pHs in the different illustrative examples. As a result, this selective diffusion of acidic gases using alkaline compounds and seeding materials can result in precipitation that provides benefits to different vulnerable zones.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for selective diffusion of acid rain, the computer implemented method comprising:
   identifying, by a number of processor units, concentrations of acidic gases using a set of satellite images;
   locating, by the number of processor units, hot spots on a land using the concentrations of the acidic gases, wherein the concentrations of the acidic gases are three dimensional column average concentrations of a vertical distribution of the acidic gases throughout an atmosphere over the land;
   classifying, by the number of processor units, the hot spots on the land into vulnerable zones having vulnerable zone classifications;
   determining, by the number of processor units, cloud seeding materials and alkaline compounds known to selectively diffuse the acidic gases and cause precipitation in the vulnerable zones based on the vulnerable zone classifications for the vulnerable zones;
   deploying, by the number of processor units, cloud seeding units with the cloud seeding materials and the alkaline compounds to the vulnerable zones to perform cloud seeding in the vulnerable zones; and
   directing, by the number of processor units, the cloud seeding units to perform the cloud seeding with the cloud seeding materials and the alkaline compounds such that the precipitation occurs in the vulnerable zones.

2. The computer implemented method of claim 1, wherein the cloud seeding with the cloud seeding materials and the alkaline compounds to selectively diffuse the acidic gases causes the precipitation in the vulnerable zones based on vulnerable zone classifications for the vulnerable zones.

3. The computer implemented method of claim 1, wherein classifying, by the number of processor units, the hot spots comprises:
   identifying, by the number of processor units, terrain topography and land usage in the hot spots; and
   classifying, by the number of processor units, the hot spots into the vulnerable zones having the vulnerable zone classifications using the terrain topography and the land usage identified in the hot spots.

4. The computer implemented method of claim 1, wherein determining, by the number of processor units, the cloud seeding materials and the alkaline compounds comprises:
   determining a level of nitrogen requirements in the precipitation to increase carbon sequestration; and
   determining an amount of the cloud seeding materials and the alkaline compounds needed to neutralize sulfur dioxide and selectively diffuse nitrogen oxides in the acidic gases to reach the level of the nitrogen requirements in the precipitation to increase the carbon sequestration.

5. The computer implemented method of claim 1, wherein determining, by the number of processor units, the cloud seeding materials and the alkaline compounds comprises:
   determining, by the number of processor units, an expected level of methane emission in the vulnerable zones; and
   determining, by the number of processor units, an amount of the cloud seeding materials and the alkaline compounds needed to neutralize nitrogen oxides and selectively diffuse sulfur dioxide based on the expected level of the methane emission such that methane emissions are reduced in the vulnerable zones.

6. The computer implemented method of claim 1, wherein determining, by the number of processor units, the cloud seeding materials and the alkaline compounds comprises:
   determining, by the number of processor units, a soil composition of the vulnerable zones; and
   determining, by the number of processor units, an amount of the cloud seeding materials and the alkaline compounds needed to partially diffuse nitrogen oxides and sulfur dioxide based on the soil composition such that the vulnerable zones neutralize sulfate acid and nitric acid in the precipitation caused using the amount of the cloud seeding materials and the alkaline compounds.

7. The computer implemented method of claim 1, wherein determining, by the number of processor units, the cloud seeding materials and the alkaline compounds comprises:

determining, by the number of processor units, an intensity of nitric oxides and sulfur dioxide in the acidic gases; and determining, by the number of processor units, an amount of the cloud seeding materials and the alkaline compounds needed to neutralize the nitric oxides and the sulfur dioxide in the acidic gases.

8. The computer implemented method of claim 1, wherein determining, by the number of processor units, the cloud seeding materials and the alkaline compounds comprises:

performing, by the number of processor units, a volumetric analysis of the acidic gases for each of the vulnerable zones to determine a mixture of the cloud seeding materials and the alkaline compounds to selectively diffuse the acidic gases.

9. The computer implemented method of claim 1, wherein the acidic gases are selected from at least one of nitrogen oxides (NOx) and sulfur dioxide (S02), ammonia (NH3) and hydrogen chloride (HCL), or hydrogen fluoride (HF).

10. A computer system comprising:

a number of processor units, wherein the number of processor units executes program instructions to:

identify concentrations of acidic gases using a set of satellite images;

locate hot spots on a land using the concentrations of the acidic gases, wherein the concentrations of the acidic gases are three dimensional column average concentrations of a vertical distribution of the acidic gases throughout an atmosphere over the land;

classify units, the hot spots on the land into vulnerable zones having vulnerable zone classifications;

determine cloud seeding materials and alkaline compounds known for the vulnerable zones to selectively diffuse the acidic gases and cause precipitation in the vulnerable zones based on the vulnerable zone classifications for the vulnerable zones;

deploy cloud seeding units with the cloud seeding materials and the alkaline compounds to the vulnerable zones to perform cloud seeding in the vulnerable zones; and direct the cloud seeding units to perform the cloud seeding with the cloud seeding materials and the alkaline compounds such that the precipitation occurs in the vulnerable zones.

11. The computer system of claim 10, wherein the cloud seeding with the cloud seeding materials and the alkaline compounds to selectively diffuse the acidic gases causes the precipitation in the vulnerable zones based on vulnerable zone classifications for the vulnerable zones.

12. The computer system of claim 10, wherein as part of classifying, by the number of processor units, the hot spots, the number of processor units further executes the program instructions to:

identify terrain topography and land usage in the hot spots; and classify the hot spots into the vulnerable zones having the vulnerable zone classifications using the terrain topography and the land usage identified in the hot spots.

13. The computer system of claim 10, wherein as part of determining the cloud seeding materials and the alkaline compounds, the number of processor units further executes the program instructions to:

determine a level of nitrogen requirements in the precipitation to increase carbon sequestration; and determine an amount of the cloud seeding materials and the alkaline compounds needed to neutralize sulfur dioxide and selectively diffuse nitrogen oxides in the acidic gases to reach the level of the nitrogen requirements in the precipitation to increase the carbon sequestration.

14. The computer system of claim 10, wherein as part of determining the cloud seeding materials and the alkaline compounds, the number of processor units further executes the program instructions to:

determine an expected level of methane emission in the vulnerable zones; and determine an amount of the cloud seeding materials and the alkaline compounds needed to neutralize nitrogen oxides and selectively diffuse sulfur dioxide based on the expected level of the methane emission such that methane emissions are reduced in the vulnerable zones.

15. The computer system of claim 10, wherein as part of determining the cloud seeding materials and the alkaline compounds, the number of processor units further executes the program instructions to:

determine a soil composition of the vulnerable zones; and determine an amount of the cloud seeding materials and the alkaline compounds needed to partially diffuse nitrogen oxides and sulfur dioxide based on the soil composition such that the vulnerable zones neutralize sulfate acid and nitric acid in the precipitation caused using the amount of the cloud seeding materials and the alkaline compounds.

16. The computer system of claim 10, wherein as part of determining the cloud seeding materials and the alkaline compounds, the number of processor units further executes the program instructions to:

determine an intensity of nitric oxides and sulfur dioxide in the acidic gases; and determine an amount of the cloud seeding materials and the alkaline compounds needed to neutralize the nitric oxides and the sulfur dioxide in the acidic gases.

17. The computer system of claim 10, wherein as part of determining the cloud seeding materials and the alkaline compounds, the number of processor units further executes the program instructions to:

perform a volumetric analysis of the acidic gases for each of the vulnerable zones to determine a mixture of the cloud seeding materials and the alkaline compounds to selectively diffuse the acidic gases.

18. A computer program product for selective diffusion of acid rain, the computer program product comprising a computer readable storage medium having program instructions embodied therewith, the program instructions executable by a computer system to cause the computer system to:

identify concentrations of acidic gases using a set of satellite images;

locate hot spots on a land using the concentrations of the acidic gases, wherein the concentrations of the acidic gases are three dimensional column average concentrations of a vertical distribution of the acidic gases throughout an atmosphere over the land;

classify the hot spots on the land into vulnerable zones having vulnerable zone classifications;

determine cloud seeding materials and alkaline compounds known for the vulnerable zones to selectively diffuse the acidic gases and cause precipitation in the vulnerable zones based on the vulnerable zone classifications for the vulnerable zones;

deploy cloud seeding units with the cloud seeding materials and the alkaline compounds to the vulnerable zones to perform cloud seeding in the vulnerable zones; and direct the cloud seeding units to perform the cloud seeding with the cloud seeding materials and the alkaline compounds such that the precipitation occurs in the vulnerable zones.

\* \* \* \* \*